May 14, 1935.  R. B. COLTON ET AL  2,000,924
BINAURAL ELECTRIC COMPENSATOR
Filed Oct. 6, 1930  3 Sheets-Sheet 1

INVENTORS
ROGER B. COLTON
HAROLD C. MABBOTT
BY Robert H. Young
ATTORNEY

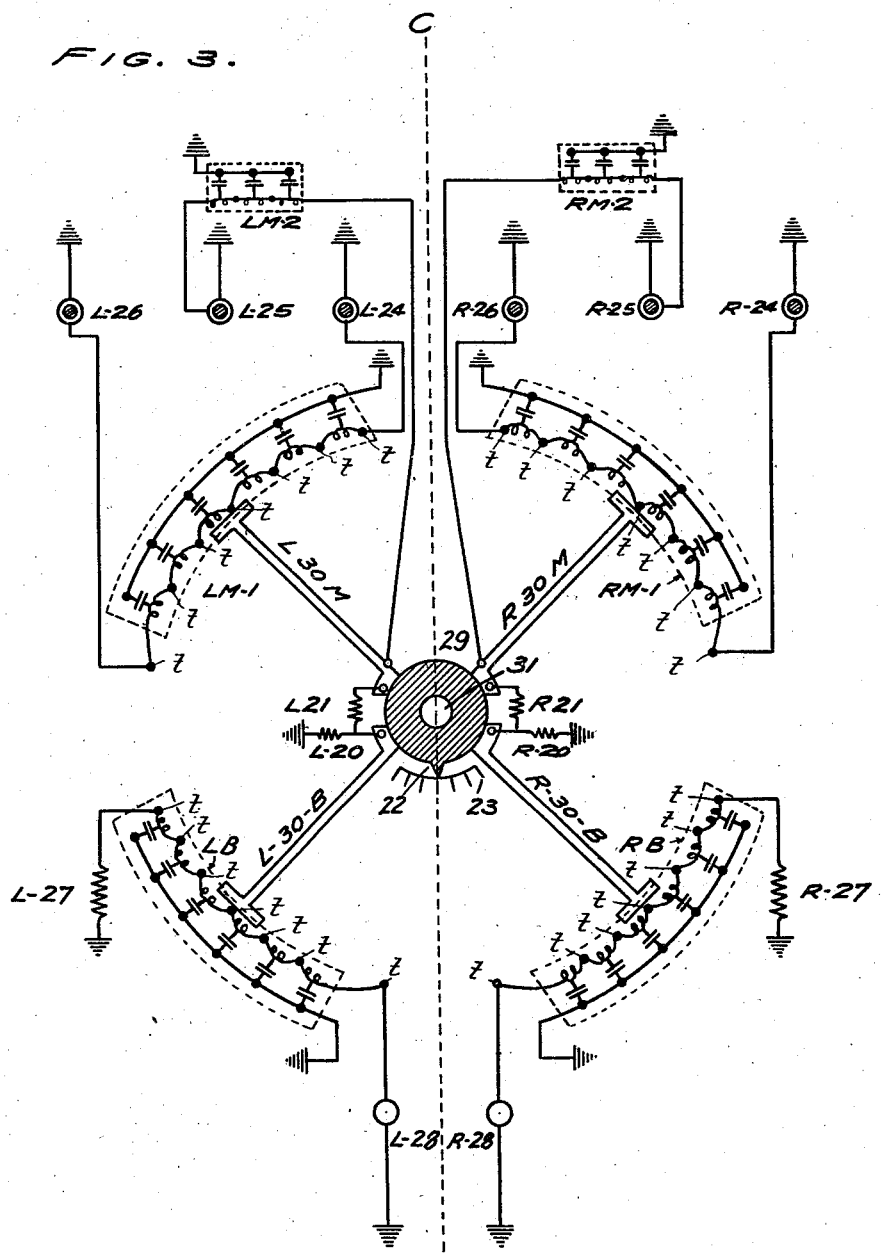

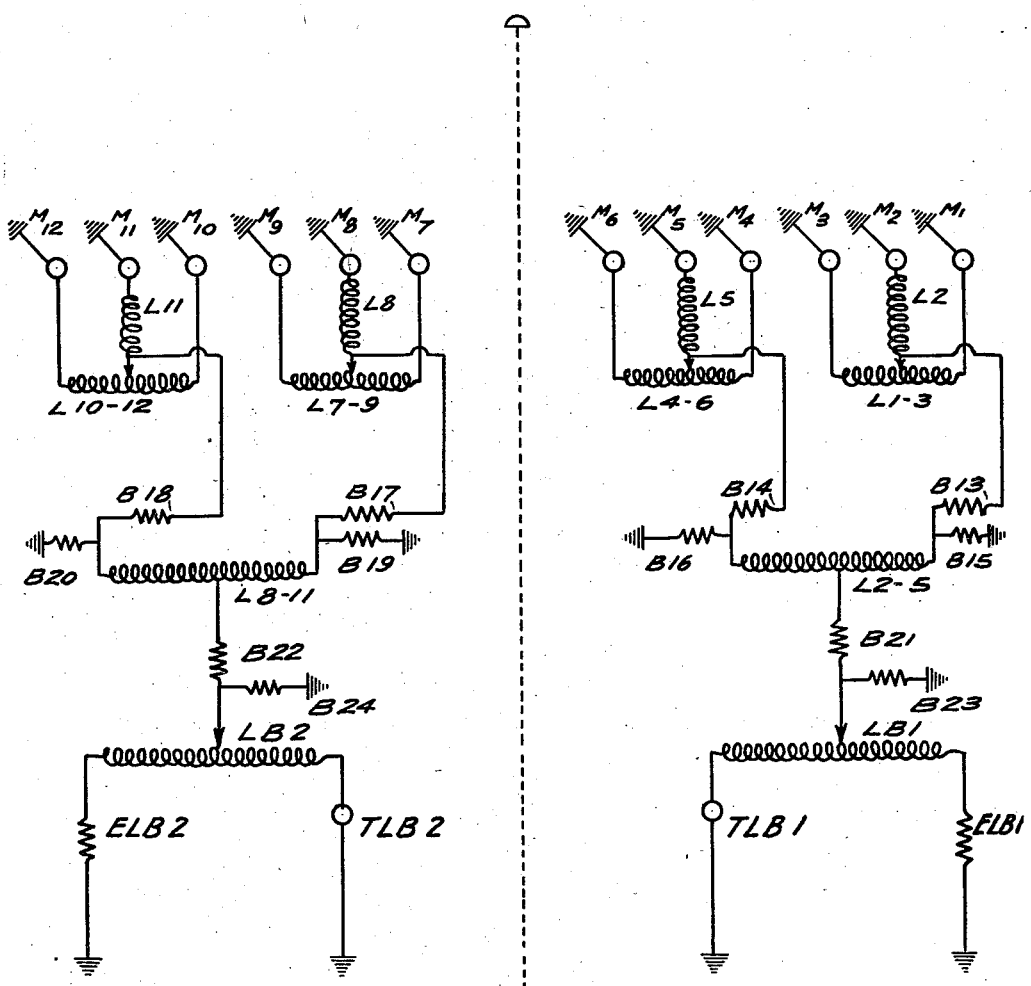

Patented May 14, 1935

2,000,924

UNITED STATES PATENT OFFICE

2,000,924

BINAURAL ELECTRIC COMPENSATOR

Roger B. Colton and Harold C. Mabbott,
Fort H. G. Wright, N. Y.

Application October 6, 1930, Serial No. 486,734

3 Claims. (Cl. 177—386)

(Granted under the act of March 3, 1883, as amended April 30, 1928; 370 O. G. 757)

The invention described herein may be manufactured and used by or for the Government for governmental purposes, without the payment to us of any royalty thereon.

Our invention relates to binaural electric compensators.

In the past these compensators, whether using one, two or more lag lines, have always been constructed on the theory that it was desirable if not essential that both ends of all lag lines have zero reflection coefficient. We have discovered that when the compensator is made in two similar parts it is only necessary that one and the same end (i. e., input or output) of each pair of similarly placed lines be made reflectionless if the reflection coefficients of the other ends are made constant and identical in value, provided the final lines are reflectionless at their output ends.

Figure 1:
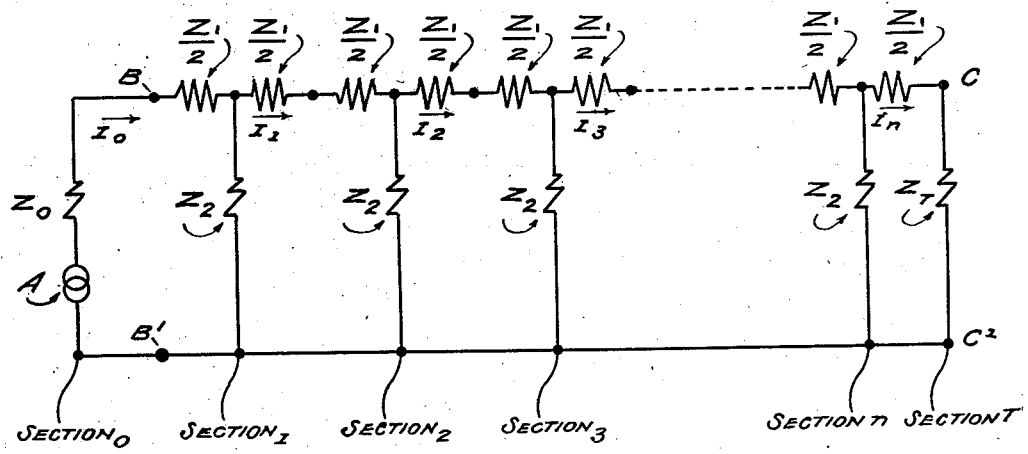

Our invention, which embodies the above and other novel principles, will be most readily rendered clear to those familiar with the art if we first give an abbreviated mathematical treatment of the principles involved. Referring to Figure 1, A is a generator supplying an electromotive force $E = A e^{i \omega t}$ (vector). $Z_0$ is the impedance exclusive of the recurrent structure at the input end. $Z_T$ is the terminal impedance or load. Sections 1, 2 and 3 - - -$n$ are identical in construction. $Z_0$, $Z_1$, $Z_2$ and $Z_T$ will initially all be allowed to have any desired electrical values. $I_0, I_1, I_2, ---I_n$ are the currents leaving the $o, 1, 2 - - -n$, sections respectively.

The structure between B B' and C C' constitutes a T section artificial line.

It can be shown that the current leaving the $m$th section, where $m$ may have any value from zero to $n$ is:—

$$I_m = \frac{E}{Z_0 + Z_\infty} \cdot \frac{K^m + YK^{2n-m}}{1 - XYK^{2n}}$$

where K is defined by the relation, $$K + \frac{1}{K} = 2 + \frac{Z_1}{Z_2}$$

and $$X = \frac{Z_\infty - Z_0}{Z_\infty + Z_0} =$$

the reflection coefficient at input end of the line, and $$Y = \frac{Z_\infty - Z_T}{Z_\infty + Z_T} =$$

the reflection coefficient at output end of the line, and $$Z_\infty = Z_1 \sqrt{\frac{1}{4} + \frac{Z_2}{Z_1}}$$

and K is a quantity of the nature $$K = P \angle \varphi$$

where P is a scalar and $\varphi$ is an angle.

It is well known to the art that line constants can be adjusted so that $$\varphi = \omega T_3 = 2\pi f T_s,$$

where $f$ is frequency and $T_s$ a constant time difference, over a wide frequency band, and all lines hereafter mentioned will be assumed as so adjusted.

It is further well known to the art that lines of the above type when designed for use as time lag lines have a surge impedance which is substantially a constant ohmic resistance at zero angle over the useful frequency band, and this condition is assumed in our remaining discussion. If $$Z_T = Z_\infty,$$

then $$Y = 0$$

$$I_0 = \frac{E}{Z_0 + Z_\infty}$$

and $$I_n = \frac{EK^n}{Z_0 + Z_\infty} = P \angle n\varphi$$

which is to say that the output current lags the input current by an angle $n\varphi$ or a time $n.T_s$ and if $Z_0$ and $Z_\infty$ are scalars the input current and voltage are both of the same phase. Further, it follows from the equations given that $$I_0 = \frac{V}{Z_\infty},$$

if V is the electromotive force impressed on the input of section I (i. e. across B B') of the line shown. Whence if an electromotive force V is simultaneously impressed on the inputs of two artificial lines each similar to that of Fig. 1, the lines being terminated by their surge impedance, the output current of either line will lag its input current by an amount $nT_s$, $n$ being the number of sections, (which may be different for the two lines) and $T_s$ being the time lag per section, of the line under consideration.

At this point we will further note that from the equations given above it follows that when an electro-motive force V is simultaneously impressed on the inputs of any number of artificial lines each similar to that of Fig. 1, each being closed at its output by its surge impedance, the effective resistance to the electro-motive force V is given by the equation:

$$\frac{1}{Z} = \frac{1}{Z'\infty} + \frac{1}{Z''\infty} + \frac{1}{Z'''\infty} + \ldots$$

where $Z$=effective combined impedance to V and $Z'\infty$, $Z''\infty$, $Z'''\infty$, etc., are the surge impedances of the respective individual lines.

If there are two lines each of surge impedance $Z\infty$, then $$Z = \frac{Z\infty}{2}.$$

Now let us suppose that the line of Fig. 1 is initiated with its surge impedance, but terminated with some other impedance. Then $X=0$ and $Y=Y_1$ whence, $$I_n = \frac{E}{Z\infty + Z_0} \cdot K^n \cdot (1 + Y_1),$$

and if the line sections be increased in number to $(n+n')$, $n'$ being any integer, there being no other change, $$I_{n+n'} = \frac{E}{Z\infty + Z_0} \cdot K^{n+n'}(1 + Y_1)$$

$$\therefore \frac{I_{n+n'}}{I_n} = K^{n'} = P \angle n'\varphi$$

or $I_{n+n'}$ is lagged $n'$ $T_s$ more than was $I_n$.

Furthermore the input impedance of such a line of $n$ sections to an electromotive force is, $$Z = \frac{Z\infty + Z_0}{1 + Y_1 K^{2n}} - Z_0 = Z\infty \frac{1 - Y_1 K^{2n}}{1 + Y_1 K^{2n}}$$

which is a complex variable depending in value upon the number of sections, $n$.

Figure 2:
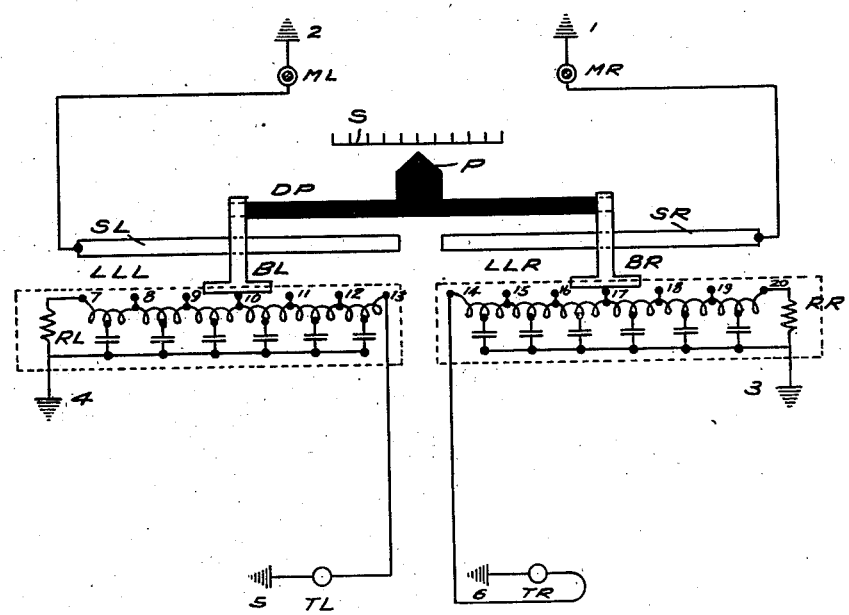

Referring to Figure 2, MR and ML are two microphones situated in a sound field. These microphones are connected as shown to the segments SR and SL respectively. Riding on and in electrical contact with the segments SR and SL are two brushes BR and BL. The brushes are maintained at a fixed interval by the insulating distance piece DP which carries a pointer P abutting on a graduated scale S. The brushes BR and BL make electrical contact respectively with the lag lines LLR and LLL at a section junction tap. LLR and LLL are in turn connected to telephones TR and TL respectively. Return current path for the microphones is provided by ground connections 1 to 6.

It is well known in the art that the direction of a distant source of sound may be determined by measuring the difference in time between like sound conditions at two microphones such as MR and ML. In the form of our invention shown in Fig. 2 this measurement is made by translating the sound conditions to electrical conditions by means of the microphones MR and ML, then adjusting the brushes BR and BL so that identical sound conditions are produced in the telephone receivers TR and TL, the human binaural sense being utilized to determine this latter identity. The adjustment used on the brushes BR and BL is the index of the time difference between identical sound conditions at MR and ML, as will appear more clearly from later discussion.

In detail, the sound pressure at MR is translated into an electric current of similar time shape by the microphone MR. This current is delivered to segment SR, brush BR and lag line LLR, thru the input terminals BR-ground. In the same manner the sound pressure at ML is translated through the microphone ML into a current of time shape similar to the said pressure and delivered through the segment SL and brush BL to the lag line LLL through the input terminals BL-ground.

In reality, the lag line LLR as seen looking into its input terminals BR-ground consists of two separate lag lines, one extending to the right from BR and one extending to the left. The line to the right is closed to ground by the ohmic resistance RR, equal in value to the surge impedance of the line LLR while the one to the left is closed to ground through the input resistance of the telephone TR likewise equal in value to the surge impedance of the lag line LLR. Similar remarks apply to the lag line LLL, the resistance RL and the telephone TL. In this case we have closed each end of LLR and LLL by its surge impedance i. e. made $Y=0$ in all cases, therefore the currents diverging from BR and BL are lagged with regard to the voltage at BR and BL an amount proportional to the number of sections between these brushes and the line output under consideration as has already been demonstrated.

Therefore when the distance piece DP is adjusted so that like sound conditions are produced by TR and TL the difference in time between like sound conditions at MR and ML is given by the equation—

$T = T_S(N_R - N_L)$, where $T_S$=time lag per section of LLR or LLL, $N_R$=number of sections between BR and the left end of line LLR, and $N_L$=number of sections between BL and the right end of line LLL, all provided the microphones MR and ML faithfully translate sound pressure.

The section junction taps 7 to 13 are equally spaced and connected, in order, to the successive section junctions of the lag line LLL. Similar remarks apply to the taps 14 to 20 inclusive and the lag line LLR. Hence the distance moved by the distance piece DP is a direct measure of the time difference sought.

The direction of the sound is determined by the formula $$\theta = \sin^{-1}\frac{VT}{D}$$

where $\theta$=angle between the sound ray and the normal at the mid-point of the line MR—ML, V—velocity of sound in the medium, D—length MR—ML.

T—time difference between like sound conditions at MR and ML. The scale S may therefore be calibrated in either time or angles to indicate the direction of the sound.

Another form of our invention is illustrated in Fig. 3. In this case our invention is arranged for its application to a system of six microphones equally spaced in a straight line. Microphones R24, R25 and R26 are connected to the right input terminal of lag line RM1, the input terminal of lag line RM2 and the left input terminal of lag line RM1 respectively. The lag lines RM1 and RM2 each have the surge inpedance $Z_m$. The lag line RM2 is connected to the rotary brush R30M. It has one half the time length of line RM1. The brush R30M is connected through resistance R21 to brush R30B which is in contact with a section junction of the lag line RB and is also connected to ground through resistance R20. The right end of the lag line RB is closed to ground through an impedance R27, equal in value to the surge impedance of that line, while the left end of this lag line is closed to ground through the input impedance of the telephone R28, which also has the same impedance value as the surge impedance of the lag line RB. Such being the case, the impedance looking from brush R30M toward its connection to brush R30B will be $$R21 + \frac{R20 \times ZB/2}{R20 + ZB/2},$$

if ZB is the surge impedance of lag line RB.

In this form of our invention we make $Z_m$, the surge impedance of RM1 or RM2 equal to $$3\left(R21 + \frac{R20 \times ZB/2}{R20 + ZB/2}\right),$$

therefore the lag lines RM1 and RM2, (the former now being considered as two lines both terminating on the brush R—30M), are terminated with their surge impedance, and in each case $Y=0$.

The description just given of the apparatus to the right of the line C C applies equally well to the apparatus to the left of this line, substituting the letter "L" for the letter "R" in the descriptive matter.

The brushes R30M, L30M, R30B and L30B are rigidly fixed to the central insulating rotating member 29 which revolves about the fixed shaft 31. The taps $t$, are, within each lag line, equally spaced and connected to successive section junctions of their associated lag lines.

The brushes R30M, L30M, R30B and L30B are so dimensioned and spaced that when brush R30B is centered on the center tap of line RB, brush R30M is centered on the center tap of line RM1, L30B is centered on the center tap of line LB and L30M is centered on the center tap of line LM1.

In the case just illustrated we made the output end of the lines RM1 and RM2 reflectionless ($Y=0$). However it is equally permissible to permit reflection at the output ends of these lines if their input reflection coefficients are equal to zero.

The output reflection coefficients of the lines RB and LB must in all cases be zero since their input reflection coefficients cannot be made zero.

The object of the net works R20, R21 and L20, L21 is to provide means of adjusting the reflection coefficient looking away from brushes R30M and L30M, from the top side. For instance the reflection coefficient at R30M will be zero when $$Z_m = 3\left(R21 + \frac{R20 \times ZB/2}{R20 + ZB/2}\right)$$

It will be noted that the effectual line composed of right half of line RM1 is always identical with the effectual line composed of the right half of LM1, RM2 is always identical with LM2, and the effectual line composed of the left half of RM1 is always identical with the effectual line composed of the left half of LM1 and these identities occur in identical order rather than symmetrically with respect to the center line C—C, therefore time differences between the two sides are preserved regardless of the nature of the two sides provided the reflection coefficients at the outputs of the aforementioned lines at brushes R30M and L30M are equal. Furthermore each of the lines, effectual or otherwise, make the current at their output lag the voltage at their input an amount proportional to their number of sections if either their X or Y coefficients are zero, as has previously been shown.

To meet the condition that the reflection coefficient at R30M and L30M shall be equal it is necessary that the impedances looking into RB and LB from R30B and L30B be equal. This proviso in turn requires that RB and LB have zero output reflection coefficients, and such is the case. If the rotor 29 is rotated counter clockwise one step, the following conditions will hold (assuming six sections in line RM1 as shown in Figure 3):—

The current from microphone R24 is lagged 4 $Tm$ ⎫
The current from microphone R25 is lagged 3 $Tm$ ⎬ Upon arrival at brush R30M
The current from microphone R26 is lagged 2 $Tm$ ⎭
The current from microphone L24 is lagged 4 $Tm$ ⎫
The current from microphone L25 is lagged 3 $Tm$ ⎬ Upon arrival at brush L30M
The current from microphone L26 is lagged 2 $Tm$ ⎭ where $Tm$ is the time lag of one section of RM1 or LM1.

The currents from R24, R25 and R26 are therefore in phase if the sound pressures on R24, R25 and R26 differ successively by 1 $Tm$, the phase of the pressure on the hydrophones on the right leading the phase of the pressure on the hydrophones on the left. Like remarks apply to the currents from L24, L25 and L26. In this case, the current delivered by brush L30B to lag line LB must necessarily lag that delivered by brush R30B to lag line RB by 3 $Tm$. However, with the rotor 29 rotated one step counter clockwise the current from brush R30B will be lagged 4 $T_B$ before delivery to telephone R28 and that from brush L30B will be lagged 2 $T_B$ before delivery to telephone L28, $T_B$ being the time lag per section of lag lines RB and LB.

Hence, in the arrangement illustrated in Figure 3 we make $3Tm = 2T_B$. Such being the case, we find that a difference in time phase between adjacent microphones:

Of 1 $Tm$ calls for one step rotation of rotor 29
Of 2 $Tm$ calls for two steps rotation of rotor 29
Of 3 $Tm$ calls for three steps rotation of rotor 29, in order to produce identical sound conditions at telephones R28 and L28. Conversely, establishment of identical sound conditions at R28 and L28 determines a time difference in sound conditions between microphones proportional to the rotation of rotor 29, and in a manner similar to that described in connection with Fig. 1, the scale 23 may be so graduated that the direction of the sound may be read therefrom opposite the pointer 22.

In Figure 4 we have illustrated schematically the application of our invention to a system of twelve microphones arranged in two groups of six each. The microphones M1 to M6 are connected in numerical order to lag lines L1—3, L2, L1—3, L4—6, L5, L4—6 as shown. The lag line L2, which has one-half of the time length of L1—3, is connected to the movable contact arm of a rotary switch (not shown) making contact with a plurality of tap segments (not shown) each of which is connected to a section junction of the line L1—3. Similar remarks apply to lag lines L5 and L4—5. From L2 and L5 we feed through the net works B13—B15 and B14—B16 into opposite ends of lag line L2—5, the section junctions of which are connected to the fixed tap segments of a rotary switch. The section junctions of the lag line LB1 are likewise connected to the fixed tap segments of a rotary switch. The movable arms of the L2—5 and LB1 switches are connected together electrically through the net work B21—B23 as indicated. Similar remarks apply to lines to the left of the line D—D. All rotary switch arms are driven in synchronism, by virtue of being on the same shaft or through suitable gearing. The time lag relationship to be satisfied by the gearing ratios and tap segment spacings is that one unit of time movement on LB1 shall cause $$\frac{d2-5}{d1-7}$$

unit of time movement on L2—5, $$\frac{d1-3}{d1-7}$$

unit of time movement on L1—3 and L4—6, "d" being read in each case, "distance between microphones numbered". Similar remarks apply to the left of the line D D.

In this form of our invention we always make Y of LB1 and LB2 equal to zero, and either X or Y of all other lines to the right of D D equal to zero, and further we make corresponding coefficients of corresponding lines to the right and left of D D equal, all as previously explained.

The net works B13, B15, B14, B16; B21, B23 and the similar networks to the left of the line D D are used to adjust reflection coefficients in the manner described in connection with Figure 3.

To facilitate identification of detailed elements of the system, it is advisable to classify the lag lines of a compensator as "tributary" and "receptor" lines. Thus, in Fig. 4, lines L1—3 and L2 are tributary to the receptor line L2—5, and when L2—5 is considered in connection with LB1, L2—5 consists of two lines (2 and 5) tributary to the receptor line LB1.

While we have shown forms of our invention as applied to sound measurements it is equally applicable to the measurement of time lag between electric currents however generated, provided they differ substantially only in the time function, said generating means being substituted for the microphones.

While in Figure 1 we have for simplicity disclosed a linear type of switch, rotary or other types of switches are equally to be considered as covered by our disclosure, since the exact type of switch is a matter of varying convenience.

While we have discussed and illustrated our invention in connection with T section lines, T or π section, or other similar types of lines, either with or without mutual inductance between elements are equally intended. Such lines are discussed; in "Electric Oscillations and Electric Waves", by George W. Pierce, McGraw-Hill Book Co., New York, N. Y., in "Electric Lines and Nets", by A. E. Kennelly, McGraw-Hill Book Co., New York, N. Y., and in "Transmission Circuits for Telephonic Communications" by K. S. Johnson, D Van Nostrand Co., 250 4th Avenue, New York City, N. Y.

All such lines have the same characteristics as the T section line discussed, though the frequency ranges throughout which they are suitable differ considerably in certain cases. Such lines form no part of our present invention except by combination.

There is no limitation on the type of microphones that may be used; they may be of electrostatic, electromagnetic, resistance variation, magnetostrictive or other type.

There is no limitation on the number of microphones that may be used. For instance, if four microphones are to be used, Figure 3 may be altered by simply omitting R25, L25, RM2 and LM2. One skilled in the art can readily understand from the discussion already given the desirable values of $Z_m$, $Z_B$, R20 and R21, L20 and L21, in this case or other cases, according to circumstances that may obtain.

Although for purposes of illustration we have shown two final lines in Figures 2, 3 and 4, one will suffice. Referring to Figure 2 we may reduce the line LLL to zero time length, connecting ML direct to RL and TL. We will now be able to measure time differences when time phase at MR is ahead of that at ML. To measure time differences when time phase at ML is ahead of that at MR we can simply exchange by a transfer switch the lines LLR and LLL. Similar remarks apply to the other forms of our invention.

Reference is made to our co-pending application, Ser. No. 486,733, filed October 6, 1930. In said companion case the principle of the invention and mode of operation are closely related to the present application. It will be noted, however, that in the present case the arrangement is such that a final receptor lag line may be fed from an interior junction point. This and other distinctions over the companion case have been brought out in the claims of this application, and will more fully appear from a comparison of the disclosures of the respective cases.

Although we have for purposes of illustration indicated the use of telephones in connection with the human binaural sense as terminal phase comparing devices, we do not intend any such limitation on our invention. Any type of phase comparing device having the required impedance value is equally applicable and equally intended.

While we have shown in each case a small number of line sections, a larger number is equally intended when greater fineness of reading is desired.

We claim:—

1. An electrical compensator adapted for use with a plurality of receivers of wave energy, said receivers being arranged in at least two groups, and including phase comparing devices operative therewith; means comprising similarly constructed circuit components for transmitting the energy from each group of said receivers to each of said phase comparing devices, each component comprising a series of tributary lag lines and a final lag line, said final line being fed from an interior point; and means interposed between successive groups of tributary lines for controlling the reflection coefficients of said lines, and whereby the output reflection coefficients of said final lag lines are made equal to zero, said means comprising series and shunt resistances forming with each succeeding lag line a network having the reciprocal of its surge impedance equal to the sum of the reciprocals of the surge impedances of the preceding group of lag lines.

2. An electrical compensator adapted for use with a plurality of receivers of wave energy, said receivers being arranged in at least two groups and including phase comparing devices operative therewith; means for transmitting the energy from each group of said receivers to each of said phase comparing devices, comprising successive groups of lag lines, each lag line consisting of inductances and capacitances; and means interposed between each group of lag lines and the following lag line, comprising series and shunt resistances forming with each succeeding lag line a network having the reciprocal of its surge impedance equal to the sum of the reciprocals of the surge impedances of the preceding group of lag lines.

3. In an electrical compensator, comprising a series of tributary and receptor lag lines, and a final receptor lag line fed at an interior point; resistance pads interposed between tributary lag lines and receptor lag lines, each pad including one or more sections composed of series and shunt resistances, and forming with its associated receptor lag line a network having, when viewed from its tributary lag line, the reciprocal of its surge impedance equal to the sum of the reciprocals of the surge impedances of associated tributary lag lines.

ROGER B. COLTON.
HAROLD C. MABBOTT.